US008395480B2

(12) United States Patent
Stevens et al.

(10) Patent No.: US 8,395,480 B2
(45) Date of Patent: Mar. 12, 2013

(54) LOW-FREQUENCY TAG SYSTEM AND METHOD

(75) Inventors: John K. Stevens, Stratham, NH (US); David Cramer, Orangeville, CA (US); Tom Packert, Miami, FL (US); Paul Waterhouse, Selkirk, CA (US); James Cassidy, Cambridge, CA (US); Rodney Gilchrist, Cambridge, CA (US)

(73) Assignee: Visible Assets, Inc., Mississauga, Ontario (CA)

( * ) Notice: Subject to any disclaimer, the term of this patent is extended or adjusted under 35 U.S.C. 154(b) by 780 days.

(21) Appl. No.: 11/768,328

(22) Filed: Jun. 26, 2007

(65) Prior Publication Data

US 2008/0129456 A1 Jun. 5, 2008

Related U.S. Application Data

(60) Provisional application No. 60/805,776, filed on Jun. 26, 2006.

(51) Int. Cl.
*H04Q 5/22* (2006.01)

(52) U.S. Cl. ........................................ 340/10.1; 340/505

(58) Field of Classification Search ................. 340/10.1, 340/572, 10.2, 10.4, 10.5, 505, 539.11, 539.16, 340/572.1, 825.49
See application file for complete search history.

(56) References Cited

U.S. PATENT DOCUMENTS

| 5,668,803 | A | * | 9/1997 | Tymes et al. ................. 370/312 |
| 5,758,075 | A | * | 5/1998 | Graziano et al. .............. 709/250 |
| 6,128,549 | A | * | 10/2000 | Swartz et al. ................. 700/225 |
| 2004/0174260 | A1 | * | 9/2004 | Wagner ....................... 340/568.1 |
| 2004/0201454 | A1 | * | 10/2004 | Waterhouse et al. ......... 340/10.1 |
| 2005/0104717 | A1 | * | 5/2005 | Kaplan ......................... 340/5.74 |
| 2006/0028352 | A1 | * | 2/2006 | McNamara et al. ..... 340/825.49 |

* cited by examiner

*Primary Examiner* — Jennifer Mehmood
*Assistant Examiner* — Yong Hang Jiang
(74) *Attorney, Agent, or Firm* — Larson & Anderson, LLC

(57) ABSTRACT

A system has tags communicating by means of low frequency (below 1 megahertz) with routers which in turn communicate with nameservers. The tags have IP addresses, either explicitly programmed into the tags or associated in a virtual way with the tags. Lookups analogous to domain lookups permit human-friendly inquiries of tag status and location. Static (battery-backed) RAM in a tag permits great versatility in the localized function of the tag.

6 Claims, 12 Drawing Sheets

Figure 1

Address + Data
With Asset

Minimal IT Required

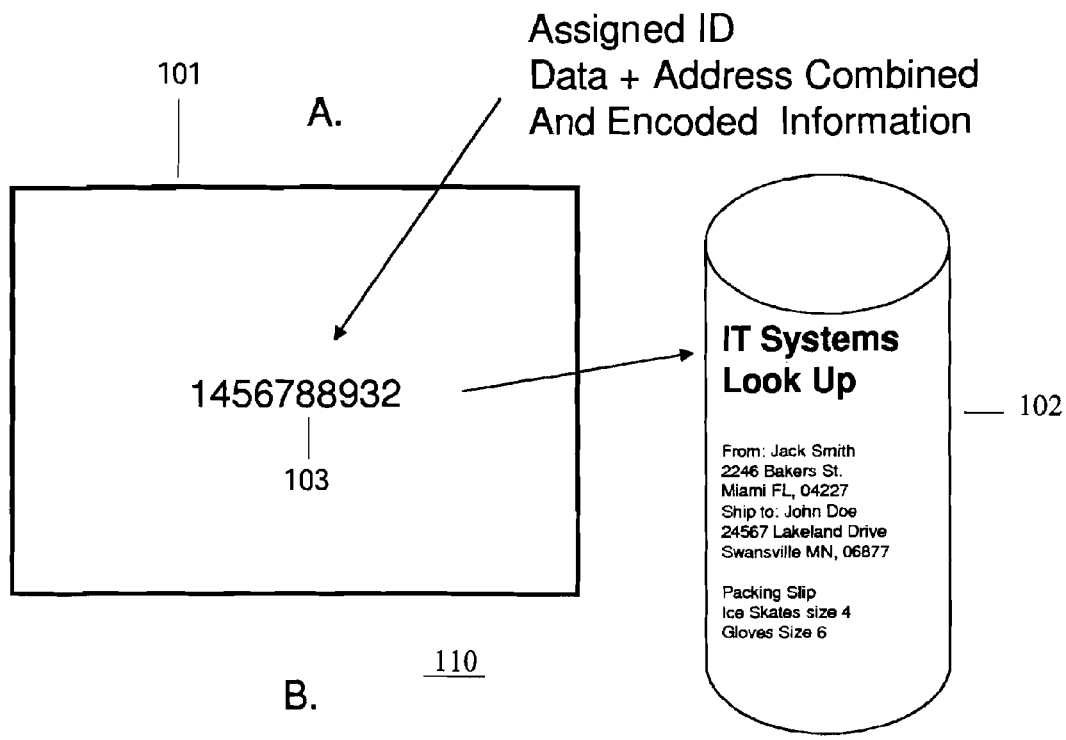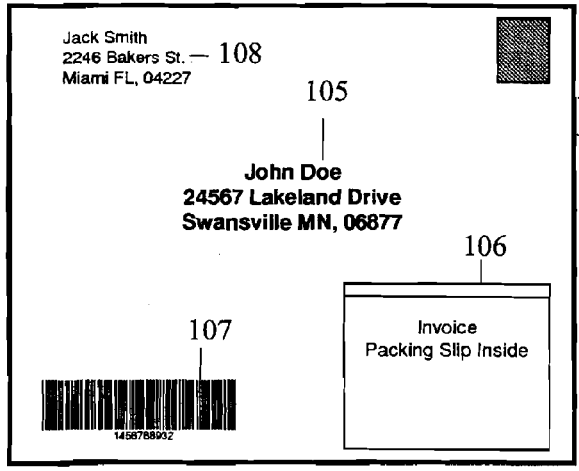
Figure 1

V4 - http://24.67.68.25:8097/234.56.78.77.114.23.44.17
V6 - http://0000:0000:1843:4419:EA38:4E4D:7217:2C11

LOW-FREQUENCY TAG SYSTEM AND METHOD

This application claims priority from U.S. application No. 60/805,776, which application is incorporated herein by reference for all purposes.

BACKGROUND

It is not easy to design systems using RF-linked tags to achieve visibility. It would be desirable to have systems that permit day-to-day functions to be achieved without the need for communications back to a central server to facilitate seemingly simple tasks. It would be desirable to have systems that scale well, and that work even with steel and water nearby. For many visibility tasks it would be very helpful to have system structure permitting knowledge of types of products or product taxonomy.

Staggering amounts of money and toil have been devoted to efforts to devise such systems. Despite this, no present-day system of RF tags has come anywhere close to satisfying such goals.

Both passive and active RF-ID tags now on the market use non-radiating backscattered mode, and all work as transponders, i.e they all need a carrier and do not work well around steel or water and cannot be networked.

The current standard EPC RFID tags all have a pre-assigned or assigned fixed ID serial number with some data encoded. It may include a header. Different formats are allowed, for example the DoD has 256 bits to define its UID (Universal Identification) versus 96 bits for all consumer goods. The CG scheme after the 8 bit header follows the current Global Trade Identification Number format of country code (2 digits); Manufacturer code 4 or 5 digits; Product Code 5 digits; and finally a serial number of 30 bits. There are possible categories for manufacturer's name but none for types of products or for product taxonomy.

Often, this serial number is created when the tag itself is manufactured. With other tag technologies the serial number is written when the product is packaged. In either case, it will be appreciated that with current RFID tags and tag networks that meet EPC global standards, the systems depend on addressing schemes based on fixed arbitrary numbers often 96-128 bits long. This also requires that key product data and information be stored in remote IT systems. An analogy is shown in FIG. 1, part A. Packages are be identified and encoded with a unique number with all information about "ship to", "ship from", and "packing slip" encoded in (and pointed to by) a number. Such systems generally require that all detailed data may be contained on a server with a key or pointer based on the encoded number.

Such systems have many drawbacks. Chief among the many drawbacks is that the system requires message-passing back to a central server and from the central server back to the user location, for even the simplest visibility task. The message passing requires bandwidth, sometimes a lot of bandwidth, both in the communications channels and in the central database, to keep up with system activity. Disruption of the communications channels brings the entire system grinding to a halt.

SUMMARY OF THE INVENTION

A system has tags communicating by means of low frequency (below 1 megahertz) with routers which in turn communicate with nameservers. The tags have IP addresses, either explicitly programmed into the tags or associated in a virtual way with the tags. Lookups analogous to domain lookups permit human-friendly inquiries of tag status and location. Static (battery-backed) RAM in a tag permits great versatility in the localized function of the tag.

DESCRIPTION OF THE DRAWING

FIG. 1 shows a conventional RF-ID tag that uses a license-plate fixed or assignable ID. It also shows a proposed system that includes as much information as possible on the package with the item.

DETAILED DESCRIPTION

Figure 2:
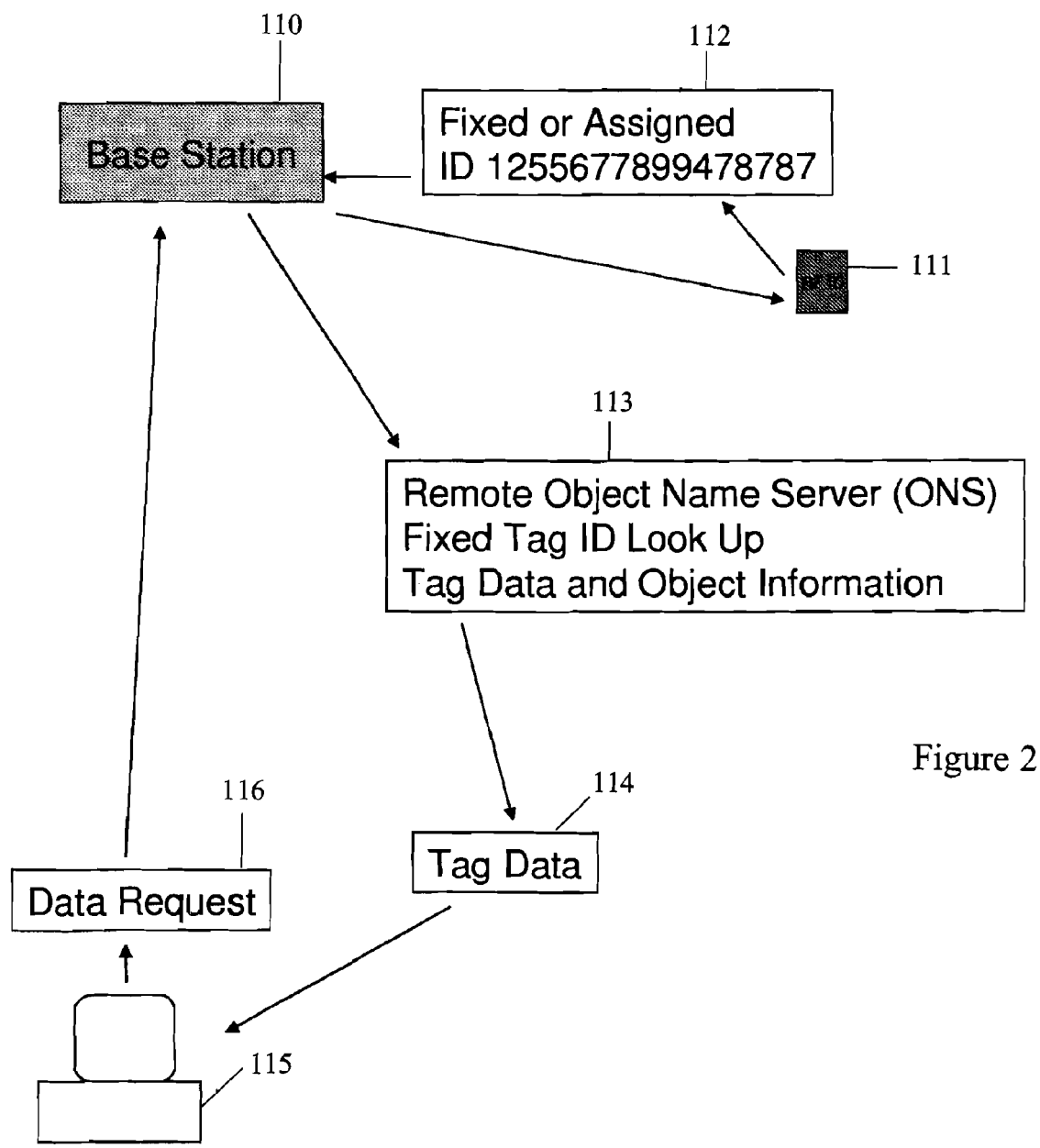
FIG. 2 shows steps required with a prior-art system to discover a tag.

As mentioned above, tags according to one embodiment of the invention work in water and near steel, in part due to their use of relatively low radio frequencies.

The tags according to one embodiment of the invention employ a full active, transmit/receive transceiver protocol with peer-to-peer, client server, IP networking. The system uses Long Wave (LW) for data communication so it can achieve low cost (less cost than many passive RF-ID tags and all active RF-ID tags), can have long battery life (10-15 years), and can work in harsh environments. The protocol is a pending IEEE standard known as P1902.1. LW tags according to the invention have achieved long-range area reads (100'×100') based on novel tunable antenna and tag designs. Tags according to the invention may be credit-card thin or just a few mm thick, and can be as small as a dime. Also, since tags have batteries, static RAM (sRAM) may be added at low cost, as well as sensors, LEDs, and displays. The chief disadvantage of the present protocol has over other systems is the data rates will always be limited to under 9,600 baud and in most case they will run at 1,200 baud. In contrast the same information can also be contained on the package itself either as human legible or machine-readable data. The "B" approach in FIG. 1 is far too expensive with current passive RFID tags since they use EEPROM to store any read/write data and the read write cycles for EEPROM are both slow and power hungry.

The tags employed can be those described in US 2007/0115132, published May 24, 2007, and incorporated herein by reference for all purposes. The RF technology can be that described in US 2007/0063895, published Mar. 22, 2007 and, incorporated herein by reference for all purposes. The tag technology can be that described in U.S. Pat. No. 7,049,963, issued May 23, 2006, and incorporated herein by reference for all purposes. The transceiver communicating with the tags can be that described in US 2007/0120649, published May 31, 2007, and incorporated herein by reference for all purposes.

The tags described herein use low-cost static memory (sRAM at 6 transistors/bit). On a bit-by-bit comparison, batteries and static memory are 100,000 times faster, 1,000 times lower write power and lower cost than EEPROM. Batteries and sRAM are used for example for critical BIOS and date time storage on PC's and laptops. The ability to use sRAM in tags as described herein opens many other unexpected opportunities. It is, for example, possible to use assignable addresses consistent with IP addresses that have become the standard under LAN and TCP/IP protocols.

Turning to FIG. 1, what is shown at "A" is a conventional RF-ID system 109 using a license-plate style fixed or assignable ID 103. A good analogy would be to use a fixed ID on a package. This requires an IT system 102 to look up the name, address, and content. In contrast the proposed system "B" (item 110) includes as much information as possible 108, 105, 106, 107 on the package 104 with the item, to minimize IT costs.

In FIG. 2, what can be seen is that the existing approach needs several steps to discover a tag 111 and to figure out to what the tag is attached. The system has to read the assigned ID 112 from a tag with a reader 110, and has to pass that ID from the reader to the reader controller to the internet, to the ONS 113 which points to the server/database where the information about that fixed ID is stored. The information returns along the same path. A data request 116 from a user at 115 requires the steps shown.

Figure 3:
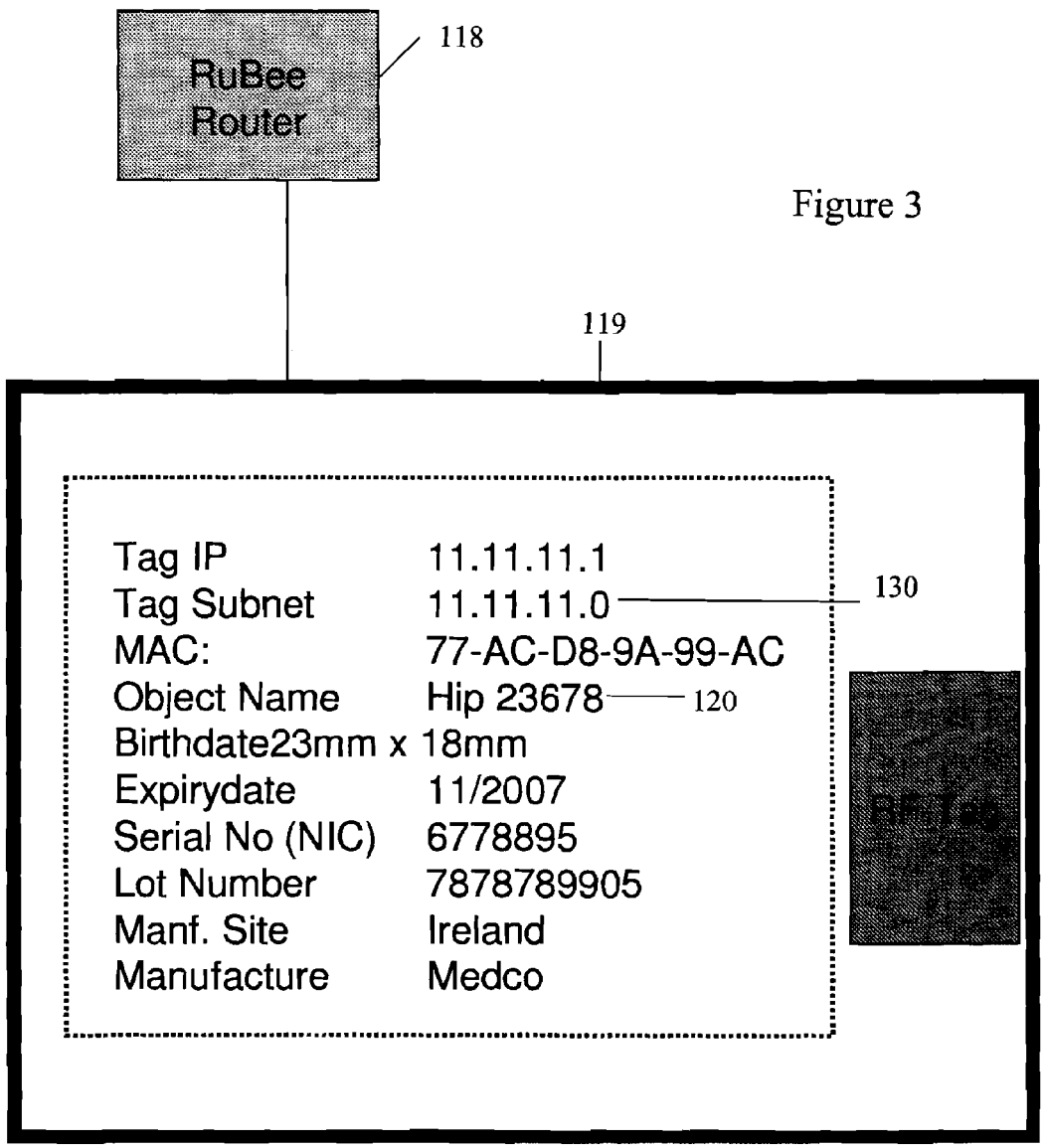
FIG. 3 shows the system according to an embodiment of the invention, using IP addresses and subnet addresses and holding most of the critical information in memory itself.

As shown in FIG. 3, in an embodiment of the invention, the system uses IP addresses and subnet addresses 130 and holds most of the critical information 120 in memory itself. The LW tags used in this system can do this at a much lower cost than the passive ID tags since passive RF-ID tags use more expensive EEPROM or similar non-volatile memory for storage. What's more, if a higher frequency were employed this would use up battery power much more quickly, by orders of magnitude. A battery and static memory in the tags according to this embodiment is less costly than EEPROM. Such tags are manufactured with a standard or default IP address such as 11.11.11.1 and a standard or default subnet 130. They may be programmed with data when the tag is attached to a product as shown in FIG. 3.

Figure 4:
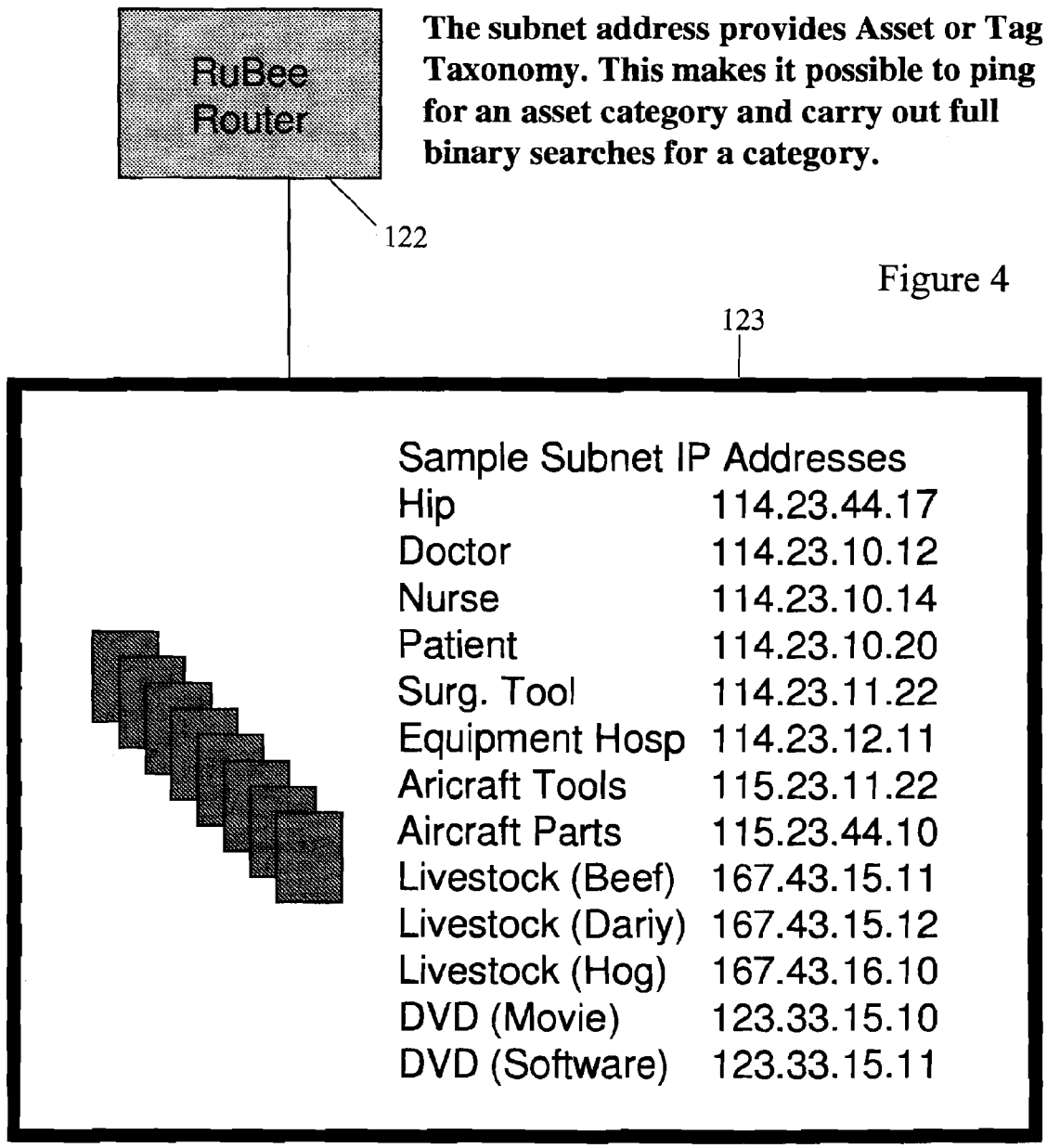
FIG. 4 shows a "Tag Taxonomy" according to the invention.

As shown in FIG. 4, the subnet address is based on a "Tag Taxonomy", this is a binary tree 123 of categories into which the product or person might be classified. For example a medical device has a different subnet address than a doctor or a patient. A beef cow has a different subnet address than a dairy cow. This means that many subnet addresses may coexist within a network. For example, a router can ping a room to see if any doctors are in the room and not have to talk to 200-300 stents that may also be stored in the same room. A user may ask hundreds of routers that are online to ping hip implants made by one manufacturer. This permits a distributed processing that can accumulate a lot of information in a very short time. In a prior-art system, on the other hand, achieving a census of hip implants would require as many lookups (in the central database) as there are tags in the universe being interrogated.

Figure 5:
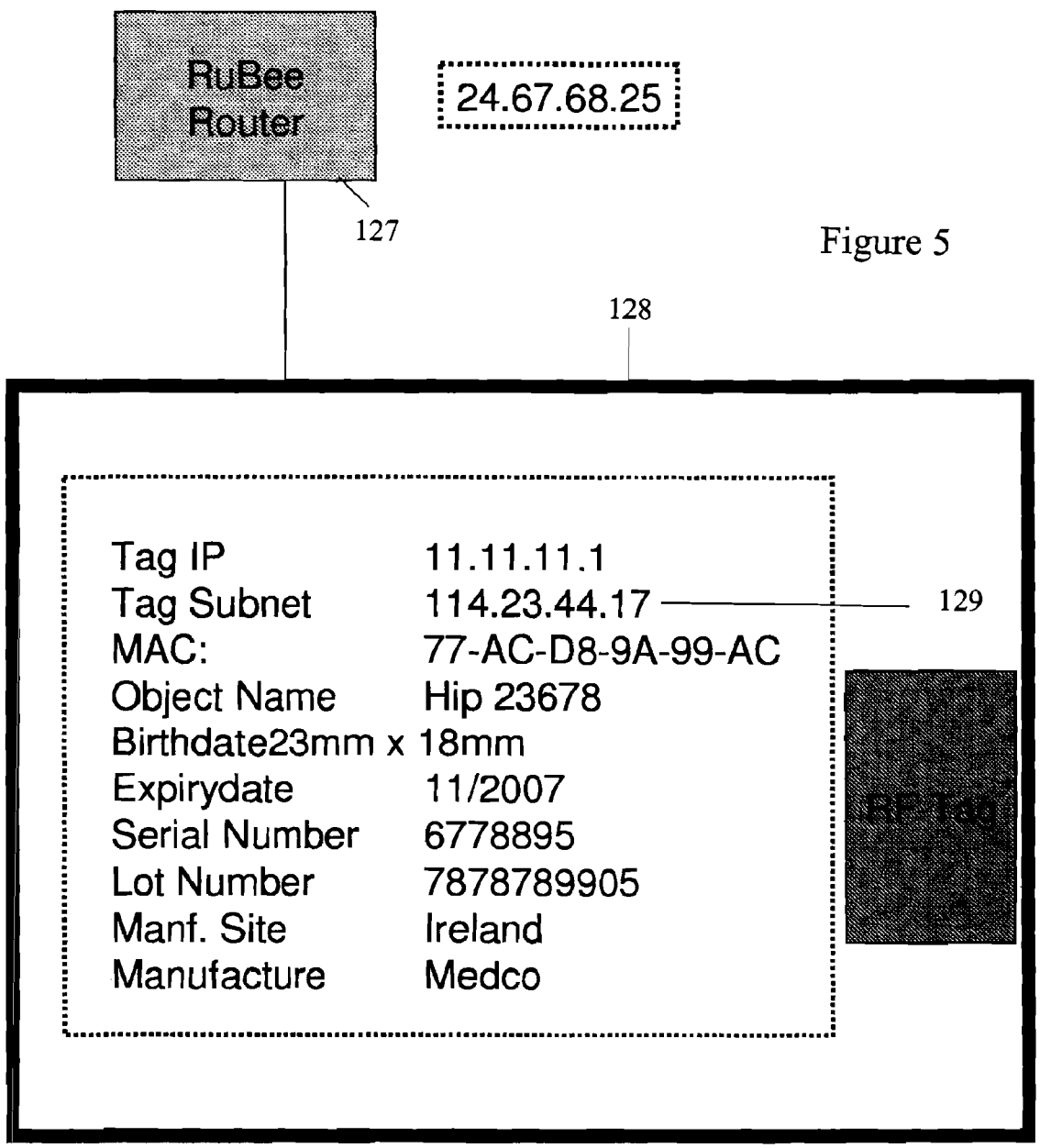
FIG. 5 shows a tag being given a new IP address from a remote IP authority, or from a block of IP addresses contained in the router.

As shown in FIG. 5, after the tag 128 has been programmed with a serial number (the same as a Mac address, or NIC number) as well as other data including the subnet address 129, it is placed into a network. The router 127 detects that the tag 128 has the 11.11.11.1 address and provides a new IP address from a remote IP authority, or from a block of IP addresses contained in the router. This is analogous to DHCP used in most networks having ISO layers 2 and 3, such as an IP network overlaid upon a number of ethernet networks.

Figure 6:
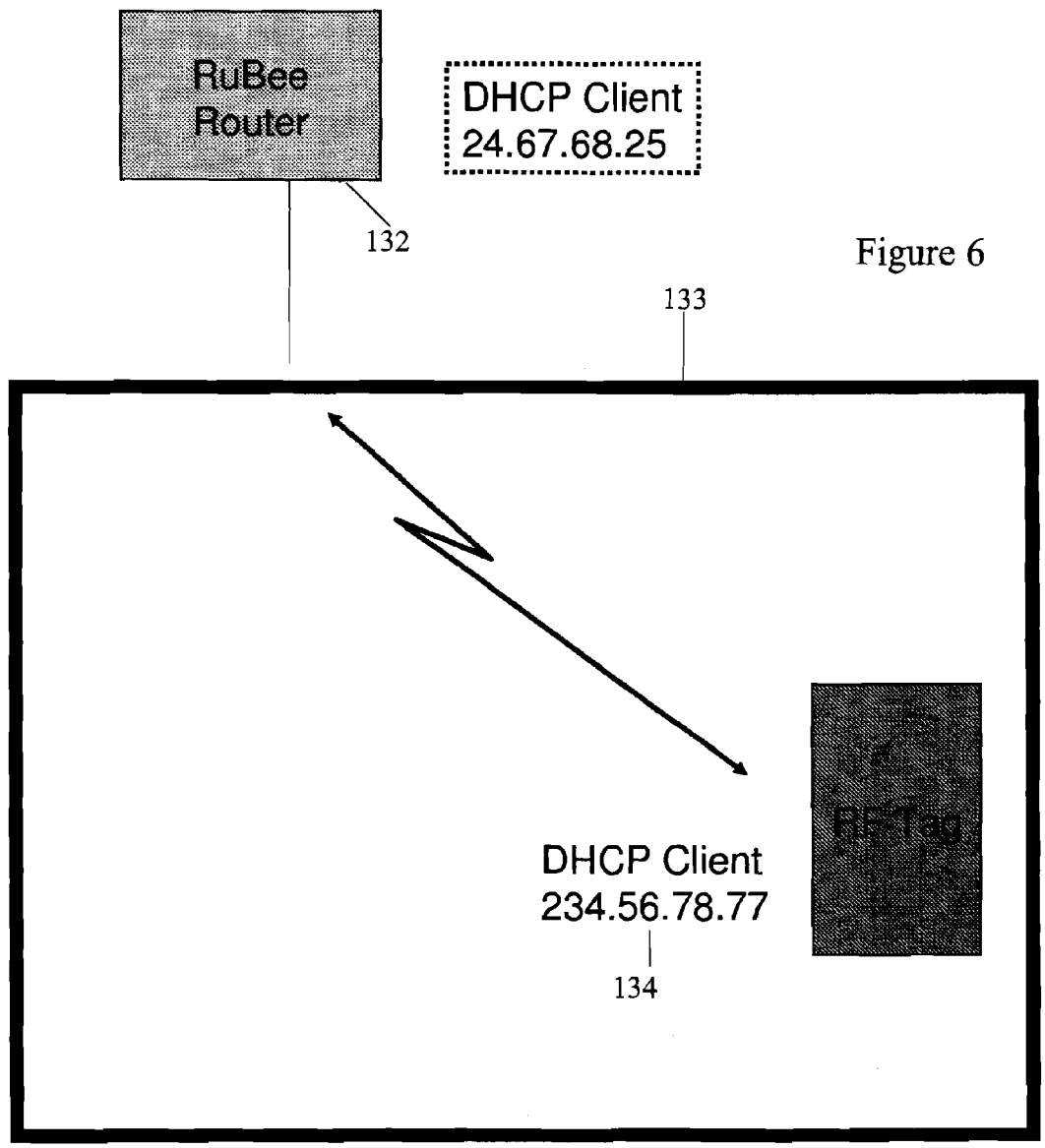
FIG. 6 shows a tag being programmed with a unique IP address once it is placed with a network and is discovered.

As shown in FIG. 6, the tag 133 may be programmed with a unique IP address 134 once it is placed with a network and is discovered by a router 132.

Figure 7:
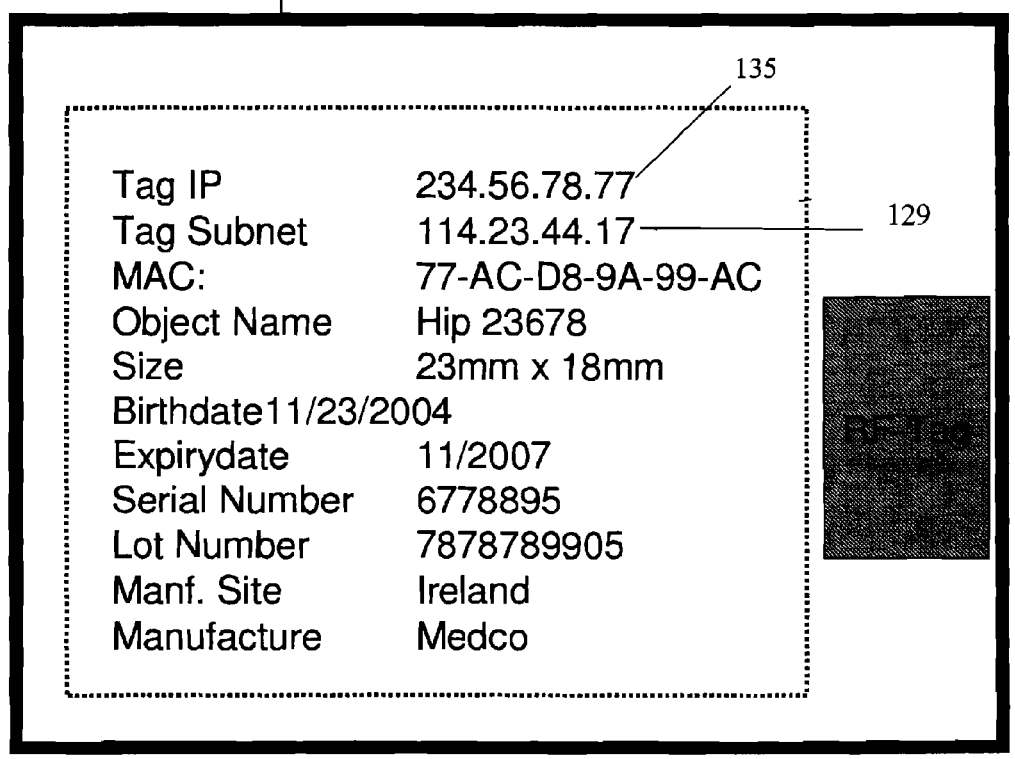
FIG. 7 shows a tag accessed with either a special IPv4 address or a standard IPv6 address.

As shown in FIG. 7, once programmed the tag maybe accessed with either a special IPv4 address 135 or a standard IPv6 address by the Router 132.

Figure 8:
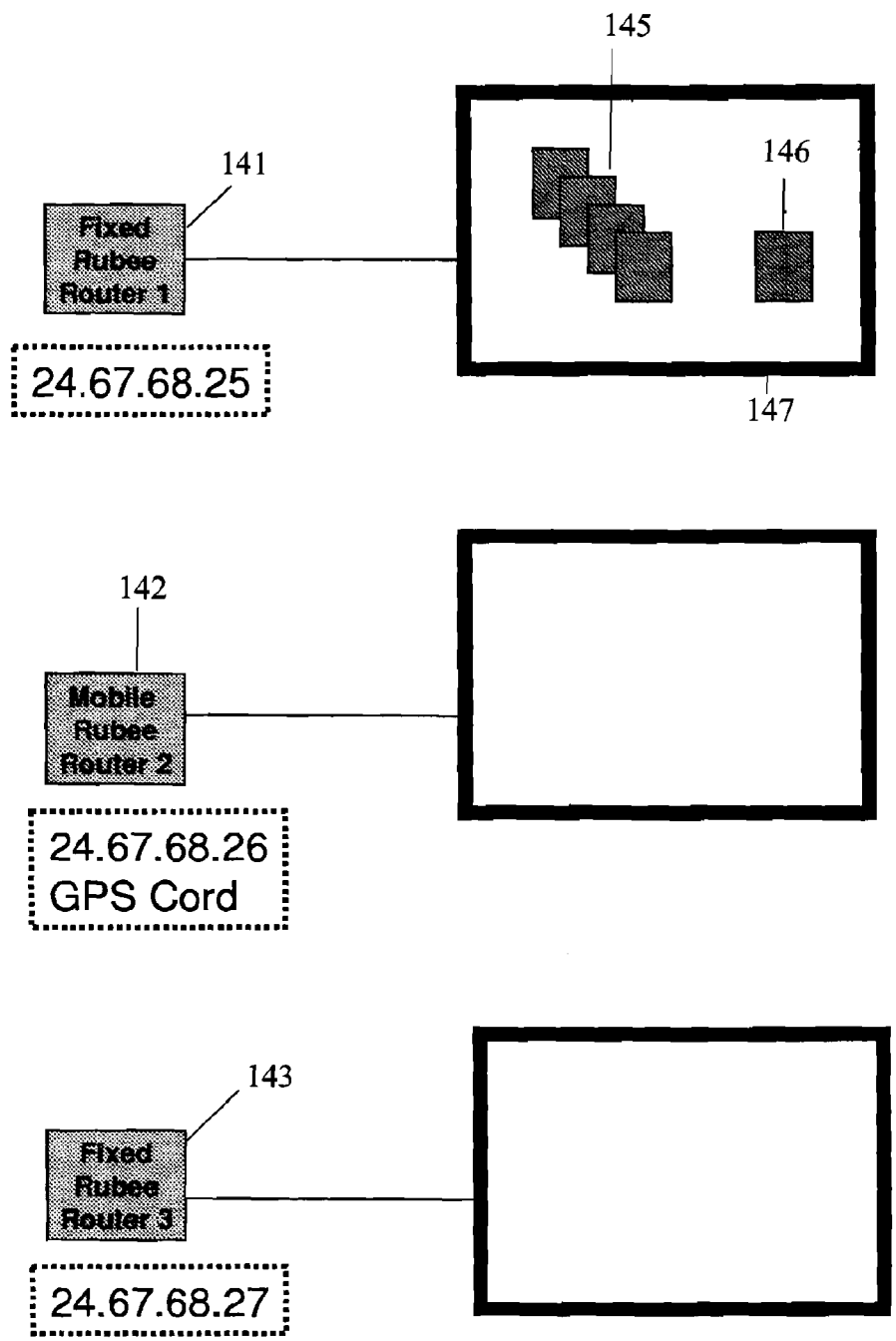
FIGS. 8-10 show a tag being moved from one subnet to another, and being discovered by an RARP.
Figure 9:
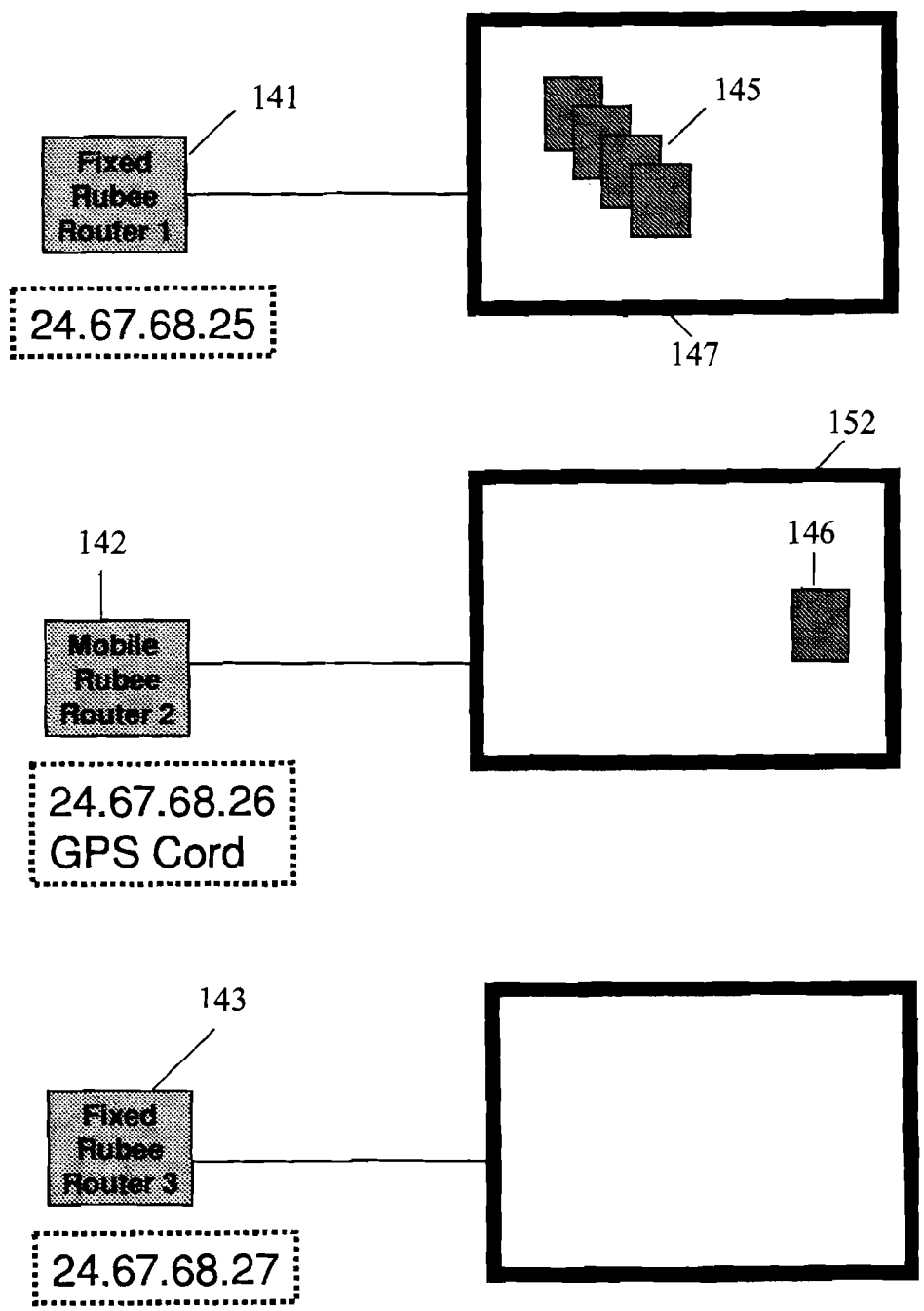
Figure 10:
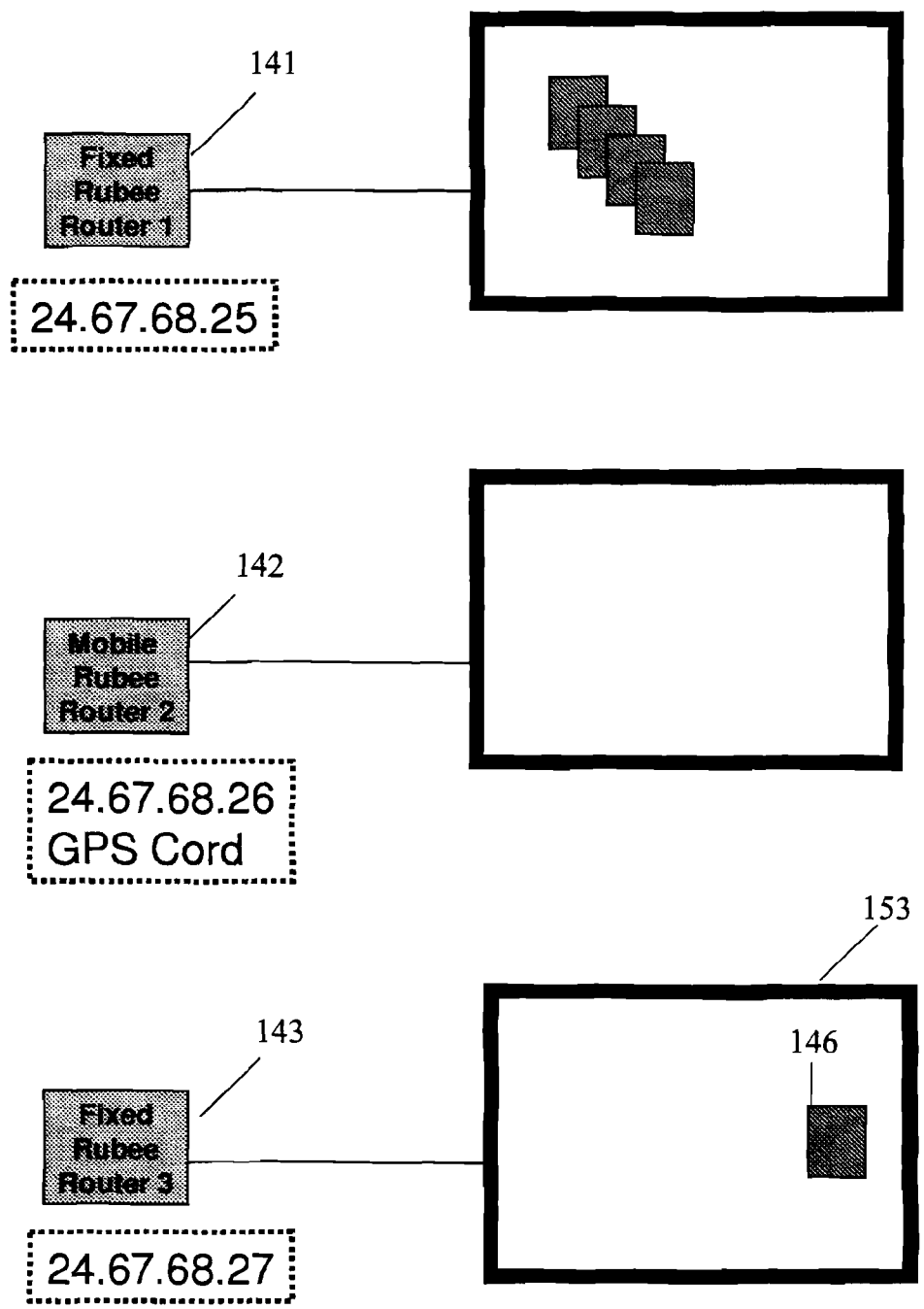

FIG. 8-10 show a process of a tag 146 moving from one subnet 147 to the next. Tags as they are moved from one network 147 to another 152, 153 are discovered by an RARP in the router 141, 142, 143 so they always have a unique IP address and can be localized within any network. Using the addressing approaches described in one embodiment herein, the limit is 4.2 billion tags with 4.2 billion different subnets for a total or $1.8 \times 10^{19}$ per local network. The Router itself (local network) may be IPv4 or IPv6 multiplying this another $1.8 \times 10^{19}$ times (264×264) or a full address space of 2128 bits.

Figure 11:
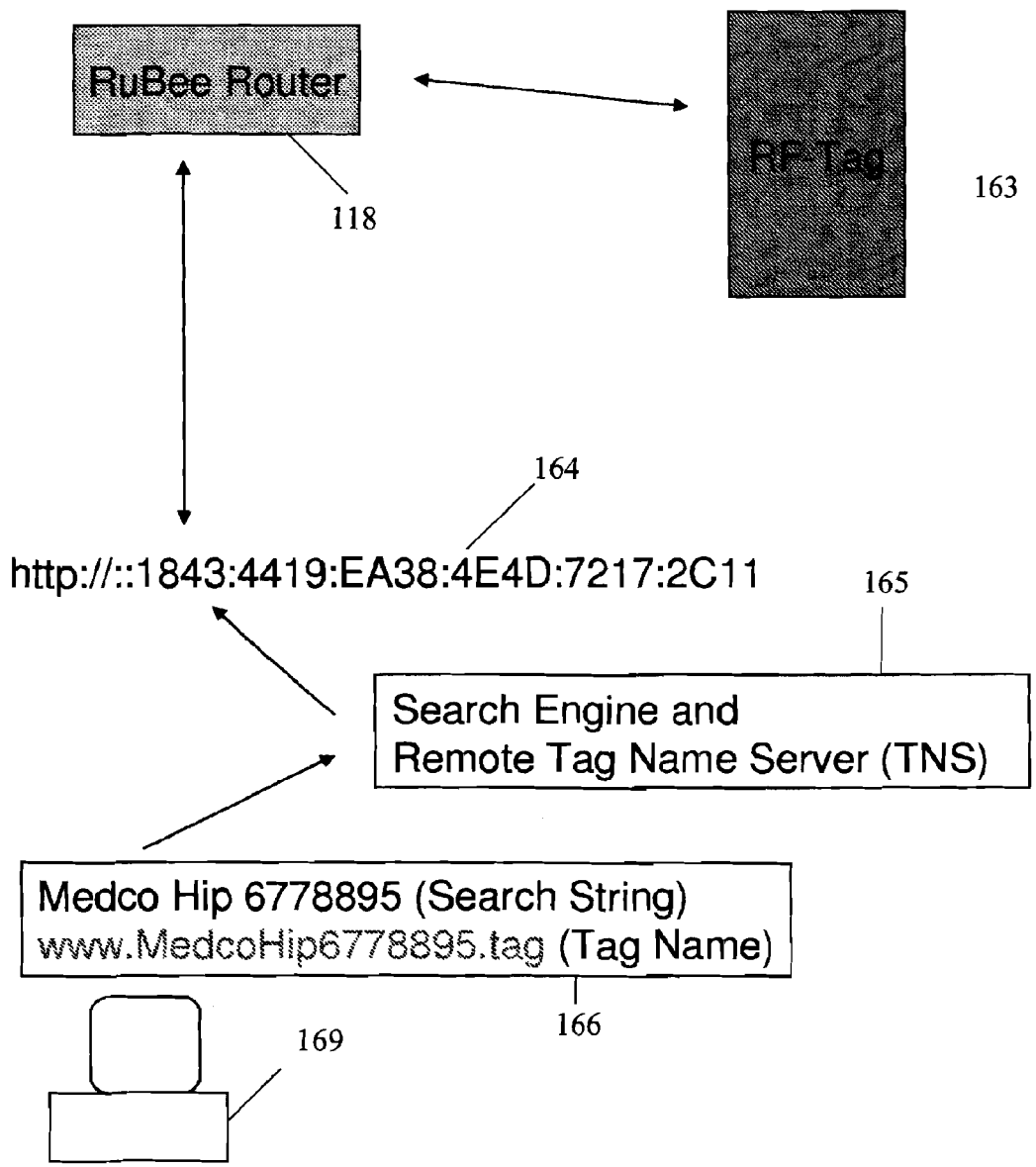
FIG. 11 shows a user searching the Web for a specific tag.

As depicted in FIG. 11, a user 169 may search the web for a specific tag 163. The Tag 163 may be given a name in the same manner that any web site is given a name through a Domain Name System. An optional Tag Name Server 165 translates this name into an IPv6 address and finds the tag 163 on the web. The user may also simply enter the IP address of the tag 166.

Figure 12:
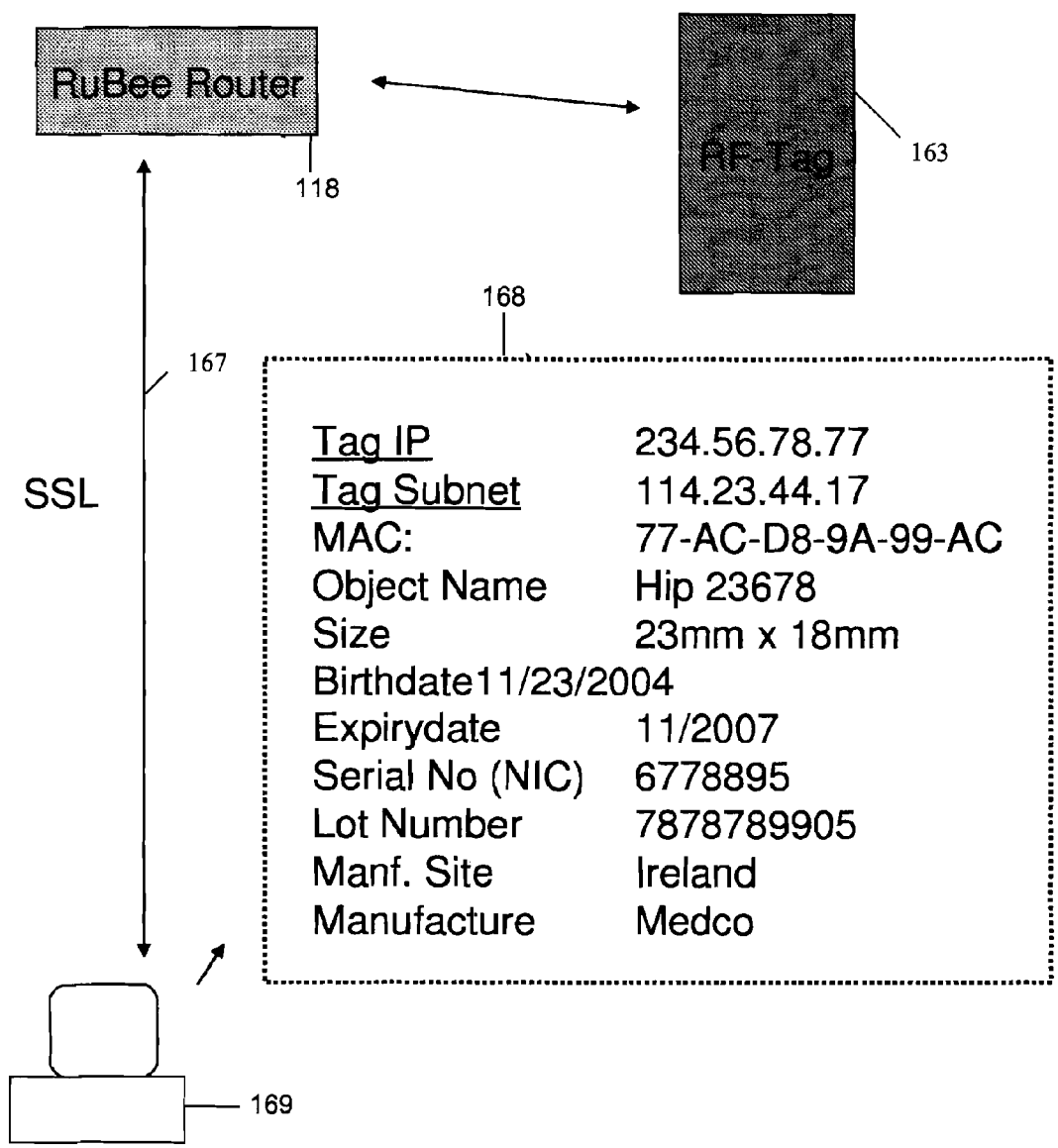
FIG. 12 shows an example of a display of data from a tag, as if on a web page.

As depicted in FIG. 12, the result for a user 169 is the data contained in the tag 163 displayed at 168 similarly to what might be viewed on a web page. The RF-IP Tag 163 thus becomes a web server. Such tags can be addressed by domain names allocated in a suitable Top Level Domain name, and domain names in this name space can be used for manual or automated searches started by middleware.

It will thus be appreciated that the embodiment just described makes it possible to search all suitable routers that are connected to the Internet, and to find any tag anywhere in the world, using the existing World Wide Web and DNS resolution infrastructure. This can be achieved with either the IPv4 or the IPv6 standard. Worldwide search schemes are proved and tested. It is likewise possible to create Virtual Private Networks (VPNs), with same security now used by major financial institutions, governments, and even the CIA—security and security levels being the customer's choice.

Because the low-frequency tags discussed here work in harsh environments near steel or water, they have applications in many different industries. Some examples are: medical devices, pharmaceuticals, asset tracking in healthcare, asset tracking in business, records tracking, tools, aircraft parts, livestock, retail visibility at item level, and airline baggage. The network can transparently provide visibility at a low cost to many of these industries.

As mentioned above, the tags in this embodiment have IP addresses which are manufactured as a standard or default 11.11.11.1 form. Such values are used for discovery when a new tag is introduced into a network. The system has an Address Resolution Protocol (ARP) as well as a Reverse Address Resolution Protocol (RARP) for new members of a radio tag net. This means a router can discover all tag's NICs and assign an IP in about a second per tag when it is introduced within an RF area. The tags all work within the Top Level Domain (TLD) using a suitable top-level domain or second-level domain. Word-based names may be registered for individual tags (for example www.drjacksmith.tag) or groups of tags (www.Medco.tag), and these maybe accessed through a name server we call the Tag Name Server (TNS), analogous to a domain name server.

The subnet address is for example 32 bits and similar to a domain or sub-domain network. It is used in each tag as an added address to classify the tag's item type, or Tag Taxonomy. For example all tags used to identify doctors in a hospital have a unique subnet address, patients another subnet, tools used in surgery another subnet. This is a binary tree and searchable. Thus, in effect doctors have their own private network within any IP subnet. When tags are used for livestock many subcategories may be assigned. Each tag has 32 bits of subnet or about 4.2 billion separate possible categories. The major advantage of the subnet is that a router can quickly discover entries (e.g can ping or use ARP) within an area. It can find all doctors, nurses, patients, devices, tools, cows, airline baggage) and rapidly discover new members of an active subnet.

TCP/IP and four ISO layers are used to manage and create any application. TCP/IP is the most widely accepted communication standard on the planet. It is also the most widely used and tested set of standards for identifying, naming and managing the largest shared network and most used database in history—the worldwide web. It seems likely that adoption of the same standard in "RF-IP" tags as described here will provide the most rapid and lowest-cost developmental vector for any asset visibility network. Also, almost any other standard may be synthetically used in any application layer, including local databases, or on-line reports of events, activity and pedigree with independent audit trails. 21CFRPart11 audit trail standards may be met with a device as described here.

Thus, the tag itself has an address space of 264 32 bit IP address and 32 bit subnet. The router according to the invention than manages the local net may be IPv4 or IPv6 so may have an additional 264 bits of address space. This any tag may have full address ability to 2128 bits. In practice, since address space and data space are not intermixed due to a large RAM budget, a local 32 bit address within any regional network is sufficient (4 billion tags per local net).

It will be appreciated that employing the teachings herein, it is possible to provide a system comprising a plurality of routers communicatively coupled with each other, each router in turn communicatively coupled via RF communication below 1 megahertz to a plurality of tags, each tag having a battery and a static RAM powered by the battery, each tag having a radio transceiver and controller, the controller of the tag controlling the transceiver and disposed to read and write information to and from the static RAM of the tag and to communicate said information via the transceiver to and from the router, each tag having a unique hardware address independent of the static RAM and independent of the battery, said unique hardware address communicable by the controller and the transceiver to and from a router, a portion of said information defining for at least one tag an address independent of the hardware address of the tag, said address stored within the static RAM, each router characterized in having routing means for routing data packets among the routers to the at least one tag with reference to the address independent of the hardware address of the tag, wherein the information stored in the static RAM further comprises a portion thereof defining a subnet mask, the subnet mask for a particular tag identifying a placement of the particular tag in a predefined taxonomy.

In such a system it is possible to interrogate the plurality of routers with respect to a particular subnet value. At each router, tags can be interrogated with respect to the particular subnet value. Responses can be received from two or more tags each having its subnet mask containing the particular subnet value. In such a case it may turn out that the responses from the plurality of routers constitute responses from more than one but less than all of the tags. A second interrogation could come a year or more after the first interrogation, with at least two of the responsive tags each powered with the same battery as at the time of the first interrogation.

The exemplary system in summary has:

1. Address space is up to 2128 bits (2×IPv6). Local tags may be addressed and discovered with a local 232-bit word.

2. Address space and address logic have been separated from data space and data logic.

3. Data and data logic (e.g. for binary searches using tags) is stored in sRAM, thus providing full flexibility to meet any past or future data standard.

Current EPCglobal and other data ANSI standards may be required for seamless integration into existing systems. These data standards may be maintained as a data register within tag memory. Thus, the system can transparently support old and new data standards as they are created. However, the system can also be used in many vertical applications that may not be standard-critical, while requiring only minimal IT. The raw data normally stored in a remote database is simply placed in the tag. This direct storage approach offers major cost reductions. It is possible to discover and read such tags within a local network, and provide full physical inventory, pedigree and asset status, with no external IT systems. These functions are provided within the Router and the tag systems that generate both 21CFRPat11 and SOX Logs within a remote server.

The invention claimed is:

1. A system comprising:
   a plurality of routers communicatively coupled with each other;
   each router in turn communicatively coupled via RF communication below 1 megahertz to a plurality of tags,
   each tag having a battery and a static RAM powered by the battery;
   each tag having a radio transceiver and controller, the controller of the tag controlling the transceiver and disposed to read and write information to and from the static RAM of the tag and to communicate said information via the transceiver to and from the router;
   each tag having a unique hardware address independent of the static RAM and independent of the battery, said unique hardware address communicable by the controller and the transceiver to and from a router;
   a portion of said information defining for at least one tag an address independent of the hardware address of the tag, said address stored within the static RAM;
   each router characterized in having routing means for routing data packets among the routers to the at least one tag with reference to the address independent of the hardware address of the tag.

2. The system of claim 1 wherein the information stored in the static RAM further comprises a portion thereof defining a subnet mask, the subnet mask for a particular tag identifying a placement of the particular tag in a predefined taxonomy.

3. A method for use with a system comprising a plurality of routers communicatively coupled with each other, each router in turn communicatively coupled via RF communication below 1 megahertz to a plurality of tags, each tag having a battery and a static RAM powered by the battery, each tag having a radio transceiver and controller, the controller of the tag controlling the transceiver and disposed to read and write information to and from the static RAM of the tag and to communicate said information via the transceiver to and from the router, each tag having a unique hardware address independent of the static RAM and independent of the battery, said unique hardware address communicable by the controller and the transceiver to and from a router, a portion of said information defining for at least one tag an address independent of the hardware address of the tag, said address stored within the static RAM, each router characterized in having routing means for routing data packets among the routers to the at least one tag with reference to the address independent of the hardware address of the tag, wherein the information stored in the static RAM further comprises a portion thereof defining a subnet mask, the subnet mask for a particular tag identifying a placement of the particular tag in a predefined taxonomy; the method comprising the steps of: interrogating the plurality of routers with respect to a particular subnet value; at each router, interrogating tags communicatively coupled thereto with respect to the particular subnet value; receiving a response from at least two tags each having its subnet mask containing the particular subnet value; whereby responses from the plurality of routers constitute responses from more than one but less than all of the tags.

4. The method of claim 3 wherein the steps of interrogating the plurality of routers, interrogating tags, and receiving a response define a first interrogation, and wherein a second interrogation is carried out at least one year after the first interrogation, at least two of the responsive tags each powered with the same battery as at the time of the first interrogation.

5. The system of claim 2 wherein the subnet mask for a particular tag identifies the type of product or person with which the tag is associated.

6. The method of claim 3 wherein the subnet mask for a particular tag identifies the type of product or person with which the tag is associated.

* * * * *